(12) United States Patent
Dimino, Jr. et al.

(10) Patent No.: US 10,496,958 B2
(45) Date of Patent: Dec. 3, 2019

(54) SYSTEMS AND METHODS FOR FORMING AND OPERATING AN ECOSYSTEM FOR A CONDUCTED ELECTRICAL WEAPON

(71) Applicant: TASER International, Inc., Scottsdale, AZ (US)

(72) Inventors: Joseph Charles Dimino, Jr., Seattle, WA (US); Siddharth Heroor, Glendale, AZ (US); Michael E. Gish, Phoenix, AZ (US); Reinhard J. Gagnon, Phoenix, AZ (US); Teri Dawn Michaels, Phoenix, AZ (US)

(73) Assignee: TASER INTERNATIONAL, INC., Scottsdale, AZ (US)

( * ) Notice: Subject to any disclaimer, the term of this patent is extended or adjusted under 35 U.S.C. 154(b) by 293 days.

(21) Appl. No.: 15/380,316

(22) Filed: Dec. 15, 2016

(65) Prior Publication Data

US 2017/0337513 A1 Nov. 23, 2017

Related U.S. Application Data

(60) Provisional application No. 62/367,040, filed on Jul. 26, 2016, provisional application No. 62/340,192, filed on May 23, 2016.

(51) Int. Cl.
*G06Q 10/10* (2012.01)
*F41H 13/00* (2006.01)
(Continued)

(52) U.S. Cl.
CPC ......... *G06Q 10/10* (2013.01); *F41H 13/0012* (2013.01); *G01M 99/008* (2013.01); *G06Q 10/087* (2013.01); *G06Q 30/0633* (2013.01)

(58) Field of Classification Search
CPC .. G06Q 10/10; G06Q 10/087; G06Q 30/0633; F41H 13/0012; F42B 35/00; G01M 99/008
(Continued)

(56) References Cited

U.S. PATENT DOCUMENTS 5,233,409 A 8/1993 Schwab
6,823,621 B2 11/2004 Gotfried
(Continued)

FOREIGN PATENT DOCUMENTS

WO 2014142920 A1 3/2013

OTHER PUBLICATIONS

USPTO, Non-Final Office Action for U.S. Appl. No. 15/380,206 dated Apr. 15, 2019.
(Continued)

*Primary Examiner* — Kevin J Comber
(74) *Attorney, Agent, or Firm* — Letham Law Firm

(57) ABSTRACT

A system that creates an environment (e.g., ecosystem) for using, transmitting, and storing data from a CEW and other equipment. The information from a CEW includes a log maintained by the CEW. The log may include information related to the operation, maintenance, software, and deployment units used by the CEW. The information may be used alone or in combination with other information received and stored by an evidence management system for managing inventory, generating use-of-force reports, incident reports, and/or providing information related to equipment, such as a CEW, to the supplier of the equipment. Sources of information provided to an evidence management system includes equipment suppliers, CEWs, other cooperating equipment, records management systems of an agency, a
(Continued)

dispatch system of an agency, and third parties. A CEW or other equipment may also receive information for storing in the log.

18 Claims, 10 Drawing Sheets

(51) Int. Cl.
    *G01M 99/00* (2011.01)
    *G06Q 10/08* (2012.01)
    *G06Q 30/06* (2012.01)
    *F42B 35/00* (2006.01)

(58) Field of Classification Search
    USPC .......................................................... 361/232
    See application file for complete search history.

(56) References Cited

U.S. PATENT DOCUMENTS

| | | |
|---|---|---|
| 7,138,913 B2 | 11/2006 | Mackenzie |
| 7,158,167 B1 | 1/2007 | Yerazunis |
| 7,520,081 B2 | 4/2009 | Kroll |
| 7,778,004 B2 | 8/2010 | Nerheim |
| 7,849,624 B2 | 12/2010 | Holt |
| 7,900,388 B2 | 3/2011 | Brundula |
| 8,351,297 B2 | 1/2013 | Lauder |
| 8,594,485 B2 | 11/2013 | Brundula |
| 9,115,944 B2 | 8/2015 | Arif |
| 9,599,440 B1 | 3/2017 | Gish |
| 9,841,259 B2 | 12/2017 | Phillips |
| 2003/0018538 A1 | 1/2003 | Tomita |
| 2009/0241394 A1 | 10/2009 | Yelle |
| 2009/0251311 A1 | 10/2009 | Smith |
| 2009/0251545 A1* | 10/2009 | Shekarri ................ G06Q 10/00 348/158 |
| 2010/0198858 A1 | 8/2010 | Edwards et al. |
| 2011/0063770 A1 | 3/2011 | Brundula |
| 2011/0156914 A1 | 6/2011 | Sheharri |
| 2012/0039013 A1 | 5/2012 | Brundula |
| 2012/0170905 A1* | 7/2012 | Brundula ................ H04N 5/76 386/239 |
| 2012/0257320 A1 | 10/2012 | Brundula |
| 2013/0080183 A1 | 3/2013 | Bond |
| 2013/0166462 A1 | 6/2013 | Glover |
| 2014/0290109 A1 | 10/2014 | Stewart et al. |
| 2014/0325592 A1 | 10/2014 | Unagami |
| 2014/0360073 A1 | 12/2014 | Stewart |
| 2015/0113851 A1 | 4/2015 | Bensayan |
| 2015/0215758 A1 | 7/2015 | Hymowitz |
| 2015/0249353 A1 | 9/2015 | Hamilton |
| 2016/0062972 A1* | 3/2016 | Ramakrishnan ...... G06F 17/243 715/226 |
| 2017/0241728 A1 | 8/2017 | Stewart |
| 2017/0337513 A1 | 11/2017 | Dimino |
| 2017/0370980 A1 | 12/2017 | Burns |
| 2018/0045492 A1 | 2/2018 | Heroor et al. |

OTHER PUBLICATIONS

USPTO, Notice of Allowance for U.S. Appl. No. 15/380,301 dated Jul. 29, 2019.

USPTO, Non-Final Office Action for U.S. Appl. No. 15/380,287 dated Sep. 12, 2019.

* cited by examiner

300

| 310 | 360 |
|---|---|
| CARTRIDGE RELATED INFORMATION:<br>CARTRIDGE IDENTIFIERS;<br>ACTIVATION (E.G., FIRED);<br>AUTHENTICATED;<br>INFORMATION TRANSFERRED;<br>COMMUNICATION PARAMETERS;<br>CALIBRATION LOG;<br>FAULTS. | FIRMWARE UPDATES:<br>DATE OF LAST UPDATE;<br>CURRENT FIRMWARE VERSION;<br>AGENCY APPROVAL OF UPDATE (ONE OR ALL DEVICES);<br>AUTO DOWNLOAD;<br>OFFICER APPROVAL TO UPDATE (CEW NOT IN USE, SAFE LOCATION & TIME);<br>FIRMWARE UPDATE IS RECEIVED AND WAITING TO BE EXECUTED. ALL QUEUED UP BEFORE STARTING |
| 320 | 370 |
| SIGNAL GENERATOR:<br>TIME OF ACTIVATION;<br>CURRENT DELIVERED TO TARGET;<br>IONIZATION PERFORMED;<br>PULSES PER SECOND;<br>CURRENT PER PULSE;<br>ELECTRODES SELECTED;<br>CROSS-CONNECT INFORMATION (E.G., PULSE RATE, SAME TARGET, DIFFERENT TARGETS, ELECTRODES THAT ELECTRICALLY COUPLE TO THE TARGET, ELECTRODES SELECTED TO DELIVER CURRENT, WHICH ELECTRODE PAIRS DELIVERED THE CURRENT);<br>FAULTS;<br>LAUNCH DETECTOR (E.G., MICROPHONE FOR DETECTING SOUND OF IONIZATION)<br>ACCELEROMETER (E.G., FOR ORIENTATION, FIRING KICKBACK) | USER INFORMATION:<br>USER IDENTIFIERS (USED FOR PAIRING);<br>INCIDENT IDENTIFIERS;<br>INCIDENT CLASSIFICATIONS;<br>PREFERENCES (FLASHLIGHT, LASER)<br>USER INFORMATION & PREFERENCES FROM CELL PHONE;<br>AGENCY SETTINGS;<br>APPROVED USER SETTINGS;<br>DEFAULT USER SETTINGS. |
| 330 | 380 |

FIG. 3A

| 330 | 380 |
|---|---|
| COMMUNICATION;<br>ACTIVATION SIGNAL TRANSMITTED;<br>LOG INFORMATION TRANSMITTED;<br>ELECTRONIC DEVICE AUTHENTICATION;<br>DOCK CONNECTION;<br>CalTest SYSTEM AUTHENTICATION;<br>COMMUNICATION PARAMETERS;<br>CEW IDENTIFIERS;<br>FIRMWARE UPDATES: WHEN VIA WHICH CHANNEL<br>   (PHONE, DOCK, PC, CalTest, CAMERA).<br>WIRELESS STATUS;<br>BLE PAIRING INFORMATION;<br>QOS FOR WIRELESS COMMUNICATION WITH ALL<br>   DEVICES, RF PARAMETERS;<br>FAULTS; | SYSTEM INFORMATION:<br>CEW IDENTIFIERS;<br>SYSTEM SETTINGS;<br>INITIALIZATION CHECK;<br>FAULTS. |
| 340<br>USER INTERFACE:<br>SAFETY ACTIVATION;<br>SAFETY DEACTIVATION;<br>CARTRIDGE ID DISPLAYED?<br>TRIGGER ACTIVATION;<br>OTHER USER ACTIVATIONS;<br>ARC SWITCH ACTIVATION;<br>ARC SWITCH ACTIVATES USER INTERFACE MODE.<br>FAULTSt; | 390<br>CALIBRATION LOG:<br>DATE LAST CALIBRATED;<br>PRE-CALIBRATION OPERATION INFORMATION;<br>INFORMATION RECEIVED FROM CalTest;<br>POST-CALIBRATION OPERATION INFORMATION;<br>FAULTS.<br>CALIBRATION IDENTIFIERS. |
| 350<br>POWER:<br>CURRENT POWER LEVEL;<br>BATTERY IDENTIFIER;<br>BATTERY REMOVED;<br>BATTERY DEAD;<br>REGULATION OF POWER TO FLASHLIGHT, LASER;<br>CLASS OF LASERS;<br>DUTY CYCLE OF LASER OPERATION;<br>LASER ON/OFF; | 395<br>GEOGRAPHIC INFORMATION:<br>GEOGRAPHIC COORDINATE OF THE LOCATION<br>   OF THE CEW. |

FIG. 3B

SYSTEMS AND METHODS FOR FORMING AND OPERATING AN ECOSYSTEM FOR A CONDUCTED ELECTRICAL WEAPON

BRIEF SUMMARY OF THE INVENTION

Embodiments of the present invention relate to data related to a conducted electrical weapon ("CEW").

BRIEF DESCRIPTION OF THE SEVERAL VIEWS OF THE DRAWING

Embodiments of the present invention will be described with reference to the drawing, wherein like designations denote like elements, and:

FIGS. 3A and 3B are a table of an implementation of a data structure (e.g., log) in memory of the CEW for storing the data produced, captured, and/or analyzed by the CEW of FIG. 1;

DETAILED DESCRIPTION

Figure 1:
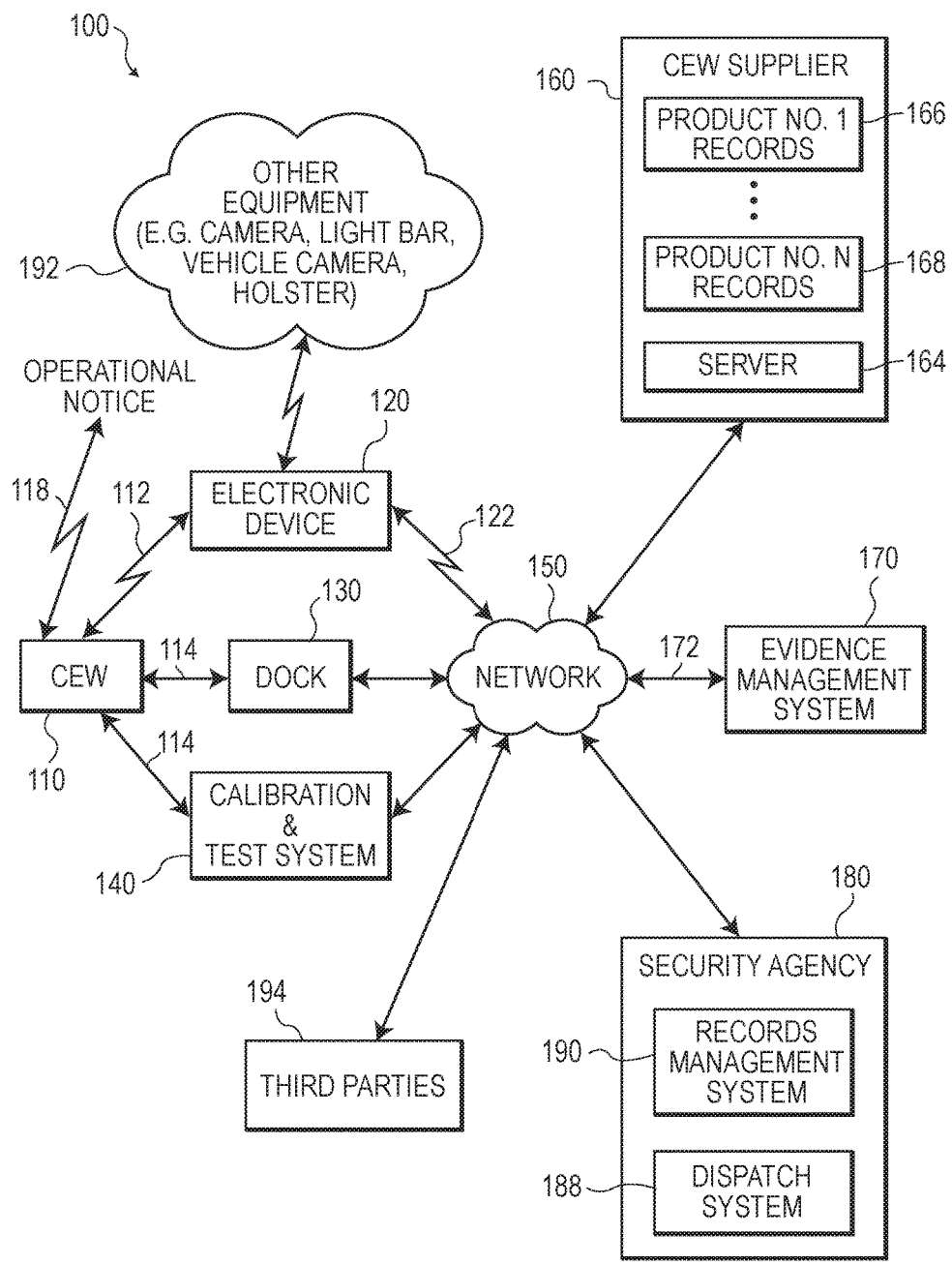
FIG. 1 is a functional block diagram of a system that creates an environment (e.g., ecosystem) for using, transmitting, and storing data from a CEW and other equipment according to various aspects of the present disclosure.

A conventional conducted electrical weapon ("CEW") is capable of producing, capturing (e.g., detecting, measuring), analyzing (e.g., calculating, estimating), and storing data (e.g., information) related to the use, operation, and performance of the CEW. A CEW may provide a current (e.g., stimulus signal) through a human or animal target that impedes locomotion of the target by interfering with use of skeletal muscles of the target. The data produced, captured, analyzed, and/or stored by a CEW may be related to delivery of the current through a target and/or other aspects of the use, operation and/or performance of the CEW. Data produced, captured, and/or analyzed by a CEW may be stored in a memory of the CEW in a data structure referred to herein as a log (e.g., data log).

Data from a CEW may be extracted (e.g., transmitted, requested, transferred, received) for use by a system. The system may include devices for extracting the information from the CEW. The system may include servers that store information recorded at an incident (e.g., evidence management system), servers that store information regarding the manufacture and/or distribution (e.g., supplying, sale, servicing) of the CEW, and/or servers (e.g., records management system, dispatch system) that store information regarding a security agency (e.g., department). A security agency may include a security agency that responded (e.g., dispatch personnel, record occurrence of the incident, apprehend perpetrators of the incident, police action related to the incident) to an incident. A security agency may use equipment for recording the incident such as video cameras and/or in-vehicle capture and/or recording devices. Personnel of (e.g., working for, employed by, affiliated with) the security agency may transport recording equipment to the scene of an incident.

Recording equipment may be used to record information at the scene of an incident. The system may include a network (e.g., wired, wireless) for communicating (e.g., transmitting, receiving) data to the various devices of the system. Recording equipment and/or recording devices may include video cameras, microphones, biological measurement devices to detect the biological state (e.g., heart rate, body temperature, ambient temperature, blood alcohol level, blood oxygen saturation level, movement) of a person, and chemical measurements to test the environment. A recording device may also record the operational state of devices (e.g., vehicle speed, location, direction of travel, number of occupants, status of a vehicle light bar, status of siren). Recording devices may be fixed or mobile.

A CEW supplier possesses (e.g., stores, generates) information regarding CEWs. A CEW supplier that manufactures and/or distributes (e.g., sales) deployment units (e.g., cartridges) and/or cameras may have information regarding deployment units and/or cameras. Information regarding CEWs and/or deployment units may include items produced (e.g., manufactured), model numbers, the identity of purchasers, serial numbers, warrantee information, firmware updates, firmware update notices, recall notices, shipping information, and/or factory calibration information. A supplier may provide information regarding CEWs and deployment units to an evidence management system. Information provided by a supplier to an evidence management system may be used in a CEW ecosystem. Information provided by a supplier, via an evidence management system, and/or in combination with information provided by a CEW, an agency, or other sources, may be used to manage an inventory of CEWs and deployment units, track inventory, monitor CEW fault information, track calibration information, send warrantee notices to purchasers, and generate and fulfill, with little or no human intervention, purchase orders for fulfillment by the supplier.

An evidence management system ("EMS") receives, provides, manages, and/or stores evidence. Evidence may include information stored and/or manipulated in digital form. Evidence may include audiovisual information captured by members of an agency regarding an incident at a location. Evidence may include information captured and/or generated by a CEW and/or deployment unit. An evidence management system may receive, store, and/or manipulate evidence on behalf of a security agency. In a conventional evidence management system, an agency controls evidence generated and/or captured by the personnel of the agency and/or information generated and/or captured by a device (e.g., CEW, deployment unit, camera) owned by the security agency. Evidence may include a log generate by a device (e.g., camera, CEW) while being used to capture evidence or to provide safety at a location.

Information received by an evidence management system from a security agency may include equipment replacement polices, agency policies, inventory of devices (e.g., CEW, camera, deployment units) controlled by the agency, policies related to informing a supervisor of an incident or a situation, and information from a dispatch system that dispatches security forces.

An evidence management system may exchange (e.g., send, receive) information with a CEW supplier, a security agency, government agencies, approved public entities, and/or private parties. Exchanging or providing information is accomplished in accordance with a policy. A policy may be established by an agency, a government agency, law, and/or the owner of the information. An evidence management system may use information received from a CEW supplier, a CEW, recording devices, and/or an agency to track inventory, monitor CEW fault information, track calibration information, send warrantee information to purchasers, and generate purchase orders with little if any human intervention.

A security agency provides security to and administers the laws of a jurisdiction. A security agency may include personnel who patrol an area, respond to calls for help from the populous of an area, apprehend people who break the law, and investigate crimes. A security agency may issue equipment for performing the functions of the security agency in an area. Equipment may include guns, CEWs, batons, handcuffs, and other gear for providing security to an area.

A dispatch system of a security agency may be use to receive requests from the populous of an area for help from the security agency. A dispatch system may be used to monitor the whereabouts of each officer of the security agency. A dispatch system may be used to select officers to respond (e.g., first responders, backup) to an incident. A dispatch system may provide information to an officer to help the officer respond to a situation.

An evidence management system may exchange (e.g., send, receive) information with a dispatch system of a security agency. An evidence management system may use information received from a dispatch system. An evidence management system may receive information from sources other than the dispatch system and may provide such information to the dispatch system. Information received by an evidence management system from a dispatch system may include time, date, location, and type of event, the personnel dispatched to an event, calls for backup, and services (e.g., police, fire, emergency medical) notified of the incident.

A security agency may maintain and use a records management system to store and manage the information collected, generated, received, and/or used by the security agency. A records management system may receive information from other systems in a CEW ecosystem. A records management system may provide information to some or all of the other systems in a CEW ecosystem. A records management system may manipulate and/or perform calculations on the data stored by the records management system. Information in a records management system may include information regarding incidents, personnel, cases information, case numbers, incident types, inventories (weapons, deployment units, vehicles, evidence, contraband), and policies. A records management system may search for specific information stored by the records management system. A records management system may prepare reports. Reports may include a use of force report and an incident report. A records management system may receive information from other systems in the CEW ecosystem to prepare reports.

A network enables electronic devices to exchange data (e.g., information). A network may include nodes. A communication link (e.g., data link) permits the transfer of information between nodes of the network. A communication link may include a wired or wireless connection. A node of a network may include a server. A server may provide and/or receive data via other nodes and communication links of the network.

An electronic device sends or receives data. An electronic device may be a node in a network. An electronic device may be stationary or portable. An electronic device may present information on a display of the electronic device. An electronic device may receive information from a user via a user interface. An electronic device may perform calculations and/or analysis of data. An electronic device may perform a calculation and/or analysis on data and provide (e.g., transmit) the result to another device. An electronic device may communicate with other devices via a wired or wireless connection. An electronic device may include a smart phone carried by an officer. An electronic device may include a tablet device, a portable computer, and/or a mobile data terminal in a vehicle. An electronic device may operate as an intermediary between an CEW and a node of the network, such as a server.

An electronic device may receive a log from one or more CEWs. An electronic device may receive a log from each CEW position at a location and/or involved in an incident. An electronic device may analyze the log from the one or more CEWs. An electronic device may provide information to one or more CEWs. An electronic device may provide information to one or more CEWs responsive to analyzing the log information. An electronic device may receive information from a user via a user interface on the electronic device. An electronic device may provide information from a user to a CEW. Responsive to analyzing a log from one or more CEWs, an electronic device may provide information to an agency. For example, an electronic device may determine via the log of a CEW that the CEW has been fired, which deployment units have launched electrodes, a status of the battery of the CEW, and that a CEW has been armed. An electronic device may send a message to an agency regarding any use or performance of any function of the CEW. An electronic device may send a message (e.g., email, text) regarding analysis of the CEW log to an individual at an agency (e.g., supervisor).

For example, electronic device 120 may receive the log from CEW 110. Electronic device 120 may analyze the log from CEW 110 and determine that CEW 110 or any of the cartridges previously used by or presently inserted into CEW 110 are past their warranty date. An electronic device may send a message that alerts an agency that it has received the log of an expired (e.g., out of warranty) CEW or that the CEW is presently using expired cartridges. An evidence management system may track all of the CEWs and cartridges of an agency and provide a notice when expired equipment is in the field.

A log from a CEW may be analyzed to determine the amount of charge and remaining time that the battery of the CEW may be used. An electronic device or the CEW may transmit a message when the remaining charge on the battery is less that the estimated charge required to complete a shift. Battery degradation (e.g., reduction of charge capacity) may also be assess and reported. Overall device health may also be assessed and any faults or suspected problems reported. Device health may include battery charge, battery capacity, detected failures and/or faults in operation, corrupt data, failure to authenticate with an electronic device, failure to detect a cartridge, detection of a cartridge not in the agency inventory, fault in calibration, an attempt by a user to alter operational parameters of the CEW contrary to the parameters approved by the agency, rapid reactivations of a stimulus signal, and communication failures.

Electronic device 120 may send a message (e.g., alert) to the user via communication link 112 and/or to the agency via communication link 122. Electronic device 120 may transmit a message regarding any information stored in log 300.

An agency may specify the types of information to be monitored in a log and reported in an alert.

A CEW may perform the same type of analysis on its own log and transmits the same types of message via communication link 118. A CEW generally analyzes and provides notices regarding its own log. An electronic device may receive, analyze and provide notices regarding the logs of many CEWs from which it receives logs. Nothing limits a CEW from receiving and reporting regarding the log of another CEW.

A calibration and test system may calibrate and/or test the operation of a CEW. A calibration and test system may verify the proper operation of a CEW. A calibration and test system may measure an amount of charge provide by a pulse of a CEW. A calibration and test system may report calibration and/or other test information to the CEW and/or the evidence management system. A calibration and test system may receive and log from a CEW during calibration and/or test and provide the log to an evidence management system, an agency, and/or a CEW supplier.

A CEW may be inserted into a dock to recharge the batteries of the CEW and/or to upload the log information from the CEW to an evidence management system. The battery of a CEW may be part of a battery module (e.g., power magazine). A battery module may be separated from the handle of the CEW to charge the battery in the battery module. A battery module may include a processing circuit, memory, a communication circuit and any other circuit for performing the functions of a battery module. Prior to separation of the battery module from the handle, the handle may transfer its log to the battery module. The battery module may transmit the log to another entity via the dock.

A battery module may establish a communication link with the dock for transferring data either by a wired connection (e.g., USB cable) or a wireless connection (e.g., WiFi, NFC). A battery module may provide information to an evidence management system via the dock. For example, information received by an evidence management system from a battery module may include battery identifier, current power level, and any information transfer to the battery module from the CEW (e.g., CEW log). A dock may be mobile (in-vehicle) or stationary.

A battery module may also be used to transfer information to the handle of the CEW. For example, while a battery communicates with a dock, whether via a wireless or wired connection, the battery module may receive information from a CEW supplier or evidence management system for transfer to the handle when the battery module is inserted into the handle. For example, a battery module may receive a software update to provide to the handle. When the battery module is inserted into the handle the battery module informs the handle that it has a software update. The handle may receive the software update from the battery module and install the software update. The handle may report in its log, to the electronic device, or directly that it has received the software update. The handle may further report whether the software update was successful.

A CEW or any other equipment that maintains a log may also download information for storage in the log via any of the paths and/or communications links discussed with respect to upload of log information. Data that may be downloaded into a log of a CEW or other equipment includes settings, firmware, configuration information, agencies policies regarding use of the device, communication parameters, and other information that controls and/or governs the operation of the CEW or other equipment.

In an implementation, a dock may receive battery modules that have been decoupled from the CEW. Prior to decoupling the battery module from the CEW, the CEW may transfer its log information and any other information that it may have to the battery module. After the battery module is decoupled from the CEW and coupled (e.g., wired, wirelessly) to the dock, the information from the CEW may be provided to the evidence management system via the dock.

For example, ecosystem 100 of FIG. 1, includes CEW 110, electronic device 120, dock 130, calibration and test system 140, network 150, CEW supplier 160, evidence management system 170, third parties (e.g., government agencies, approved public entities, private parties) 194, and other equipment 192. CEW supplier includes server 164. Server 164 may include data structures for storing product records, for example, product records 166 through 168. Security agency 180 includes records management system 190 and dispatch system 188.

Third party 194 may include any type of electronic equipment and/or communication equipment for providing and receiving information. Third party 194 may receive information from and/or provide information to an evidence management system. Third party 194, such as a government agency, may order that evidence management system 170 provide information. Third party 194, such as the public and/or a private individual may provide data to or receive data from evidence management system 170 consistent with a policy set in place by the agency or entity that controls, provides, or receives the information.

Ecosystem 100 performs the functions of an ecosystem discussed herein. CEW 110, electronic device 120, dock 130, calibration and test system 140, network 150, evidence management system 170, CEW supplier 160, and security agency 180 perform the functions of a CEW, an electronic device, a dock, a calibration and test system, a network, an evidence management system, a CEW supplier, and a security agency respectively discussed herein.

A CEW performs many different types of functions. Before, during, or after many of the functions, the CEW records information regarding performance of the function in a log maintained by the CEW. An important function performed by a CEW is to provide a stimulus signal through a target to impede locomotion of the target. Prior to providing a stimulus signal through a target, a CEW must be armed. Arming a CEW requires a user to switch the safety switch on the user interface of the CEW from the on-position to the off-position. Arming a CEW causes the CEW to power up and to initialize itself.

Arming and initializing a CEW results in information (e.g., data) being recorded in the log of the CEW. A log may have a particular structure in memory. For example, log 300 of FIG. 3, has a particular structure for recording information related to different functions performed by a CEW. Data related to different operations of the CEW is recorded in the different sections (e.g., 310, 320, so forth) and data fields of the sections. For example, arming a CEW results in the CEW transmitting a signal that it has been activated. A record that the activation signal was transmitted at a specific time (e.g., timestamp) is stored in the activation signal transmitted data field of communication section 330 in the log. A record of switching the safety from the on-position to the off-position is recorded in the safety activation data field of user interface section 340.

After being armed, the CEW initializes its circuits and subsystems. Initialization includes providing (e.g., transmitting) information to and receiving information from each deployment unit inserted into a bay (e.g., 270, 272) of the CEW. The CEW verifies the power level of the battery and the serial number of the battery. The CEW checks for pairings with electronic devices, user information, pairing with any Bluetooth devices, parameters set for communication with other devices, and determination of any faults that were detected in any of the sub-circuits of the CEW. During initialization, laser power may be set.

Arming and initialization may result in recording a record and associated timestamps in at least some of the data fields of the various sections identified below in Table 1. Other data fields in other sections, not identified below may also store data and a timestamp.

TABLE 1

Arming and Initialization

| Data field | Section |
| --- | --- |
| Current power level | Power 350 |
| Battery identifier | Power 350 |
| Battery dead | Power 350 |
| Safety deactivation | User Interface 340 |
| Initialization check | System information 380 |
| Wireless Status | Communication 330 |
| BLE pairing information | Communication 330 |
| QOS for wireless communication with all devices, RF parameters | Communication 330 |
| Electronic device identifiers | Communication 330 |
| Electronic device authentication | Communication 330 |
| User identifiers | User information 370 |

Activating (e.g., pulling) the trigger results in an attempt to deliver a stimulus pulse through a target. A stimulus signal includes a series of current pulse. Pulses are provided for a period of about 5 seconds each time the trigger is pulled. During the 5 second period, pulses are delivered at around 22 pps or 44 pps. The pulses are provided by signal generator 220 in cooperation with processing circuit 210. Providing a current through a target also requires the cooperation of one or more deployment units to launch electrodes toward the target to deliver the current. Pulling the trigger may result in recording a record and associated timestamps in the data field of the various sections identified below in Table 2. Other data fields in other sections, not identified below may also store data and a timestamp.

TABLE 2

Activation

| Data field | Section |
| --- | --- |
| Cartridge identifiers | Cartridge related information 310 |
| Activation | Cartridge related information 310 |
| Authenticated | Cartridge related information 310 |
| Time of activation | Signal Generator 320 |
| Current delivered to target | Signal Generator 320 |
| Ionization performed | Signal Generator 320 |
| Pulses per second | Signal Generator 320 |
| Current per pulse | Signal Generator 320 |
| Electrodes selected | Signal Generator 320 |
| Cross-connect information | Signal Generator 320 |
| Activation signal transmitted | Communication 330 |
| Cartridge ID displayed | User interface 340 |
| Trigger activation | User interface 340 |

In the event that a firmware update is available for a CEW and the CEW receives and installs the firmware update, receiving and installing the firmware update may result in recording a record in the data fields of the various sections shown below in Table 3.

TABLE 3

Firmware Update

| Data field | Section |
| --- | --- |
| Date of last update | Firmware Updates 360 |
| Current firmware version | Firmware Updates 360 |
| Agency approval of update | Firmware Updates 360 |
| Auto download | Firmware Updates 360 |
| Officer approval to update | Firmware Updates 360 |
| Firmware update is received and waiting to be executed | Firmware Updates 360 |
| Firmware updates: when, via which channel | Communication 330 |

A CEW may receive a firmware update (e.g., software, instructions, firmware) via a wired or wireless communication link from other equipment 192 via electronic device 120, calibration and test system 140 via communication link 116, electronic device 120 via communication link 112, and/or dock 130 via communication link 114. A firmware update may be further received by a CEW from a battery pack installed into the CEW.

Other operations of the CEW record information in other various data fields in the sections of log 300. The name of the section and the data field provides information as to the operation that relates to the data stored in the sections and data fields.

The information stored in log 300 may be transferred to an evidence management system for analysis and performing operations related to the log information provided by the CEW alone or in combination with other data (e.g., evidence management system, records management, supplier information) as discussed above.

The information from a log may be transferred from a CEW to an evidence management system via an electronic device, a dock, and/or a calibration and test system. For example, the data from log 300 may be transferred from CEW 110 to evidence management system 170 as discussed above. The data from log 300 may be transferred from CEW 110 to evidence management system 170, via communication link 172, when CEW 110 connects to calibration and test system 140 to perform period testing as to the proper operation of CEW 110 and/or for calibrating the amount of charge provided by each pulse of a stimulus signal.

A CEW may further provide the information from its log to an evidence management system via an electronic device. A CEW may transfer its log information to an electronic device while it is arm and/or performing the functions that are enabled while the CEW is armed. A CEW may transfer its log information to an electronic device after the CEW has been disarmed, but before power is shut off to the circuits needed to transfer the log.

Figure 2:
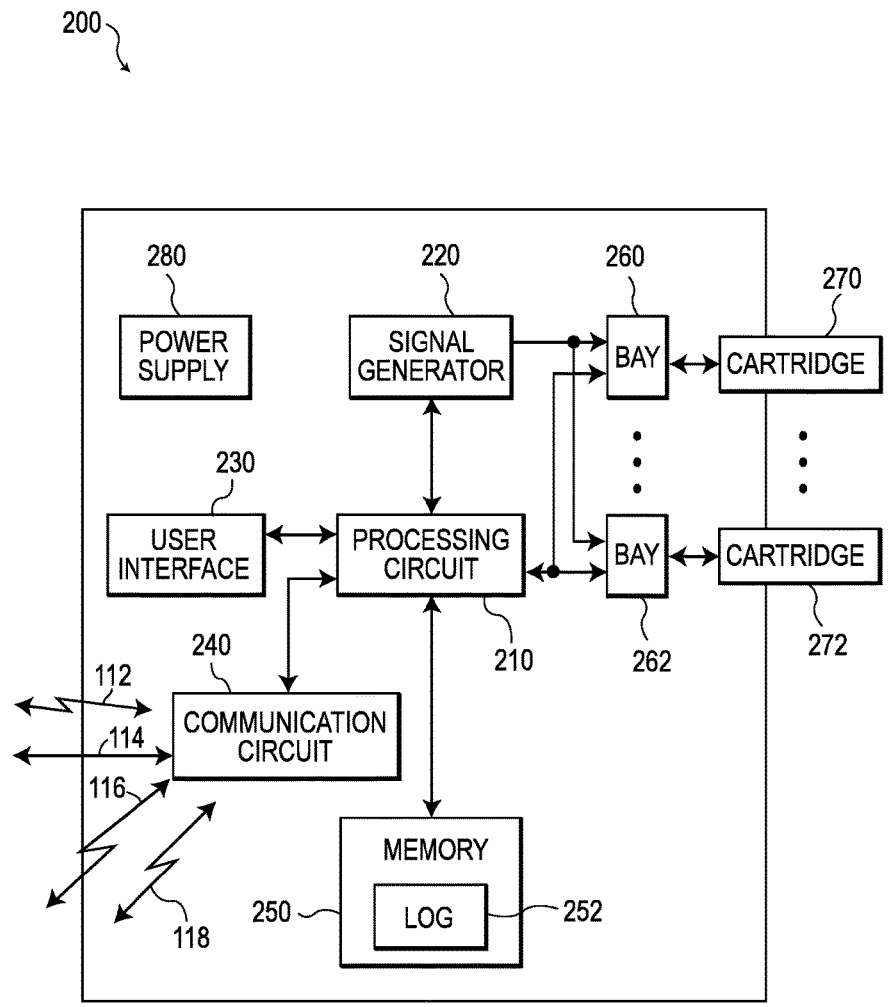
FIG. 2 is a functional block diagram of an implementation of the CEW of FIG. 1.

CEW 200 of FIG. 2 includes processing circuit 210, signal generator 220, user interface 230, communication circuit 240, memory 250, bay 260, bay 262, and power supply 280. Memory 250 includes data structure log 252. Cartridge 270 and cartridge 272 removeably insert into bay 260 and bay 262 respectively. CEW 200 performs the functions of a CEW as discussed above. CEW 200 performs the functions of CEW 110 discussed above. CEW 110 may be implemented as CEW 200.

A power supply provides power (e.g., energy). For a conventional CEW, a power supply provides electrical power. Providing electrical power may include providing a current at a voltage. Electrical power from a power supply may be provided as a direct current ("DC"). Electrical power from a power supply may be provided as an alternating current ("AC"). A power supply may include a battery. A power supply may provide energy for performing the functions of a CEW. A power supply may provide the energy for a current that is provided through a target to impede locomotion of the target. A power supply may provide energy for operating the electronic and/or electrical components (e.g., parts, subsystems, circuits) of a CEW and/or one or more deployment units. The energy of a power supply may be renewable or exhaustible. A power supply may be replaceable. The energy from a power supply may be converted from one form (e.g., voltage, current, magnetic) to another form to perform the functions of a CEW.

A user interface may include one or more controls that permit a user to interact and/or communicate with a CEW. Via a user interface, a user may control (e.g., influence, select) the operation (e.g., function) of a CEW. A user interface may provide information to a user. A user may receive visual, haptic, and/or audible information from a user interface. A user may receive visual information via devices that visually display (e.g., present, show) information (e.g., LCDs, LEDs, light sources, graphical and/or textual display, display, monitor, touchscreen). A user interface may include a communication circuit for transmitting information to an electronic device (e.g., smart phone, tablet computer, laptop computer) for presentation to a user.

A processing circuit may detect the operation of a control (e.g., button, switch, touch screen) of a user interface. A processing circuit may perform a function of the device responsive to operation of a control. A processor may perform a function, halt a function, resume a function, or suspend a function of the device of which the control and the processor are a part. A control may provide analog or binary information to a processor. Operation of a control includes operating an electromechanical device or selecting a portion of touch screen.

A processing circuit includes any circuitry and/or electrical or electronic component for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, evidence management system devices, signal conditioning circuitry, communication circuitry, a conventional computer, a conventional radio, a network appliance, data busses, address busses, and/or any combination thereof in any quantity suitable for performing a function and/or executing one or more stored programs.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function, control a function, and/or to perform a stored program.

A processing circuit may control the operation and/or function of other circuits and/or components of a system such as a CEW. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus. The handle may include a processing circuit. Each deployment unit may include a processing circuit.

A memory may store instructions and data for a processing circuit. A processing circuit may include an integrated (e.g., internal) memory. A memory may be separate from a processing circuit. The contents of a memory may be static (e.g., non-volatile, SRAM, flash). The contents of a memory may be dynamic (e.g., DRAM). A memory may include any conventional technology (e.g., solid-state, magnetoresistive, resistive, ferroelectric).

A signal generator provides a signal (e.g., stimulus signal). A signal may include a current. A signal may include a pulse of current. A signal may include a series (e.g., number) of current pulses. The signal provided by a signal generator may electrically couple a CEW to a target. A signal generator may provide a signal at a voltage of sufficient magnitude to ionize air in one or more gaps in series with the signal generator and the target to establish one or more ionization paths to sustain delivery of a current through the target as discussed above. The signal provided by a signal generator may provide a current through target tissue to interfere with (e.g., impede, disable) locomotion of the target. A signal generator may provide a signal at a voltage to impede locomotion of a target by inducing fear, pain, and/or an inability to voluntary control skeletal muscles as discussed above. A signal that accomplishes electrical coupling and/or interference with locomotion of a target may be referred to as a stimulus signal.

A stimulus signal, as discussed above, may include one or more pulses of current. A pulse of current may be provided at one or more magnitudes of voltage. Pulses may be delivered at a pulse rate (e.g., 22 pps) for a period of time (e.g., 5 seconds). A pulse of current may accomplish electrical coupling and impeding locomotion as discussed above. A current pulse of a conventional stimulus signal includes a high voltage portion for ionizing gaps of air to establish electrical coupling and a lower voltage portion for providing current through target tissue to impede locomotion of the target. A portion of the current used to ionize gaps of air to establish electrical connectivity may also contribute to the current provide through target tissue to impede locomotion of the target.

A signal generator may receive electrical energy from a power supply. A signal generator may convert the energy from one form of energy into a stimulus signal for ionizing gaps of air and interfering with locomotion of a target. A processing circuit may cooperate with and/or control a power supply in its provision of energy to a signal generator. A processing circuit may cooperate with and/or control a signal generator in converting the received electrical energy into a stimulus signal.

A communication circuit transmits and/or receives information (e.g., data). A communication circuit may transmit and/or receive (e.g., communicate) information via a wireless link and/or a wired connection. A communication circuit may communicate using wireless (e.g., radio, light, sound, vibrations) and/or wired (e.g., electrical, optical) mediums. A communication circuit may communicate using any wireless (e.g., Bluetooth, Zigbee, WAP, WiFi, NFC, IrDA) and/or wired (e.g., USB, RS-232, Firewire, Ethernet) communication protocols. A communication circuit may receive information from a processing circuit for transmission. A communication circuit may provide received information to a processing circuit.

A communication circuit in one device (e.g., CEW) may communicate with a communication circuit in another device (e.g., smart phone, tablet). Communications between two devices may permit the two devices to cooperate in performing a function of either device.

A communication circuit enables a CEW to communicate with an electronic device (e.g., smart phone, tablet computer, laptop computer). The communication between the CEW and an electronic device may be wired (e.g., Ethernet, USB, RS-232). The communication between the CEW and an electronic device may be wireless (e.g., Bluetooth, Bluetooth Low Energy ("BLE"), WiFi, Zigbee, Near Field Communications ("NFC"). LTE). Information transferred between the CEW and an electronic device may be encrypted (e.g., encoded, enciphered).

The electronic device may exchange (e.g., receive and/or transmit) information with the CEW. The information provided by the CEW may include usage history (e.g., logs), deployment dates and times, device information (e.g., manufacturer, serial number, software version, power supply type), deployment units (e.g., serial numbers) fired, reports, status (e.g., operational state, safety on/off, amount of energy (e.g., charge, current, voltage) used or remaining in the power supply), and configuration information. Information provided to the CEW may provide commands (e.g., instructions), configuration information, and software updates.

A deployment unit (e.g., cartridge) removeably inserts into bays of a CEW. The deployment unit may channel current from the signal generator. A deployment unit may include one or more electrodes. Upon CEW trigger activation, the deployment unit propels the electrodes toward a target to deliver a stimulus signal through target tissue which impedes the locomotion of a target.

User interface 230 includes a control (e.g., switch), not shown) so that a user may arm and disarm CEW 200. A switch for arming and disarming CEW 200 maybe referred to as a safety. When the safety is positioned in an on-position, CEW 200 is disarmed and cannot provide a stimulus signal for impeding locomotion of a target. When the safety is positioned in an off-position, CEW 200 is armed and may perform most if not all of the function of CEW 200.

Disarming CEW 200 shuts (e.g., powers) down the signal generator 220, bay 260, bay 262, cartridge 270, and cartridge 272. After CEW 200 is disarmed, the power supply 280 continues to provide power, at least for a period of time, to user interface 230, processing circuit 210, communication circuit 240, and memory 250 in order to transmit data to an electronic device. CEW 200 may establish a communication link with an electronic device to transfer data from log 252 to the electronic device. Establishing a communication link may be accomplished in any convention manner consistent with a conventional communications protocol. For example, CEW 200 may pair, using the Bluetooth communications protocol with an electronic device. The data transmission between the CEW 200 and electronic device may be encrypted. Pairing may authenticate CEW 200 and/or the electronic device.

An electronic device may receive data from CEW 200 as discussed above. An electronic device may forward data from a CEW to an evidence management server via a network. The network for forwarding the information from a CEW may be wired or wireless. An electronic device may use any conventional communication circuit to communicate (e.g., transmit, send, receive) information to and from CEW 200 and/or to and from a server of the evidence management system via the network.

An electronic device may augment data received from CEW 200 prior to forwarding the information to an evidence management system. Information added by an electronic device to the data from CEW 200 may include the geographic location of the electronic device and information provided by a user to the electronic device via a user interface of the electronic device.

Figure 4:
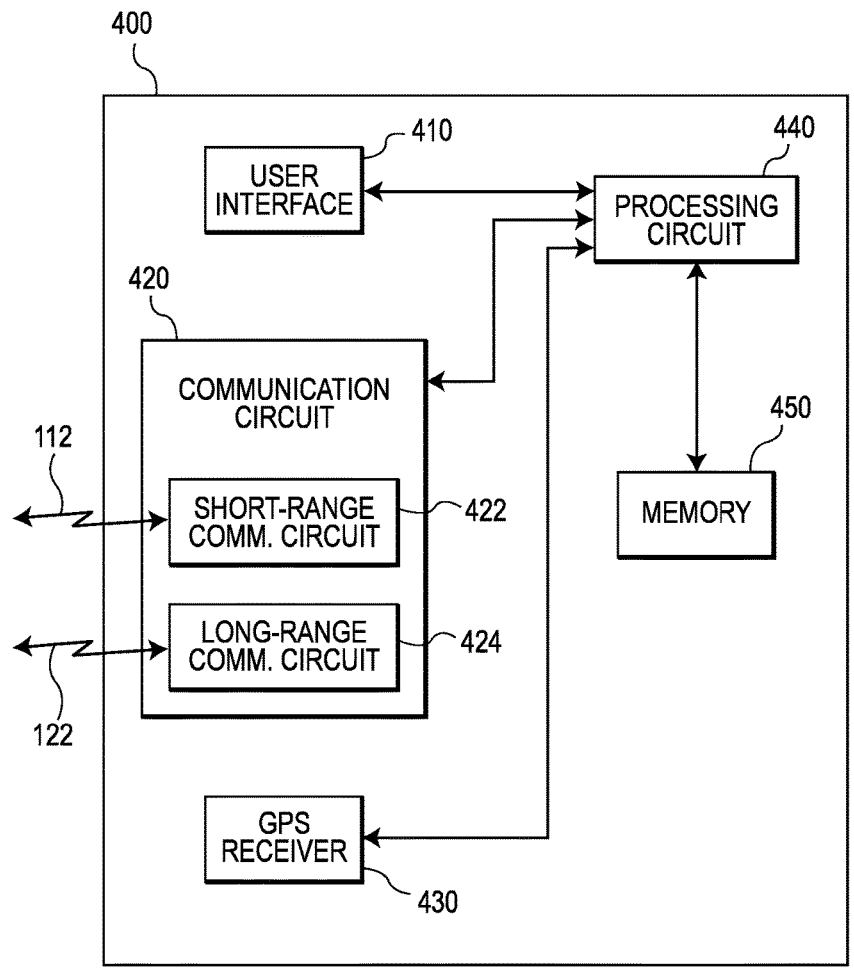
FIG. 4 is a functional block diagram of an implementation of the electronic device of FIG. 1.
Figure 5:
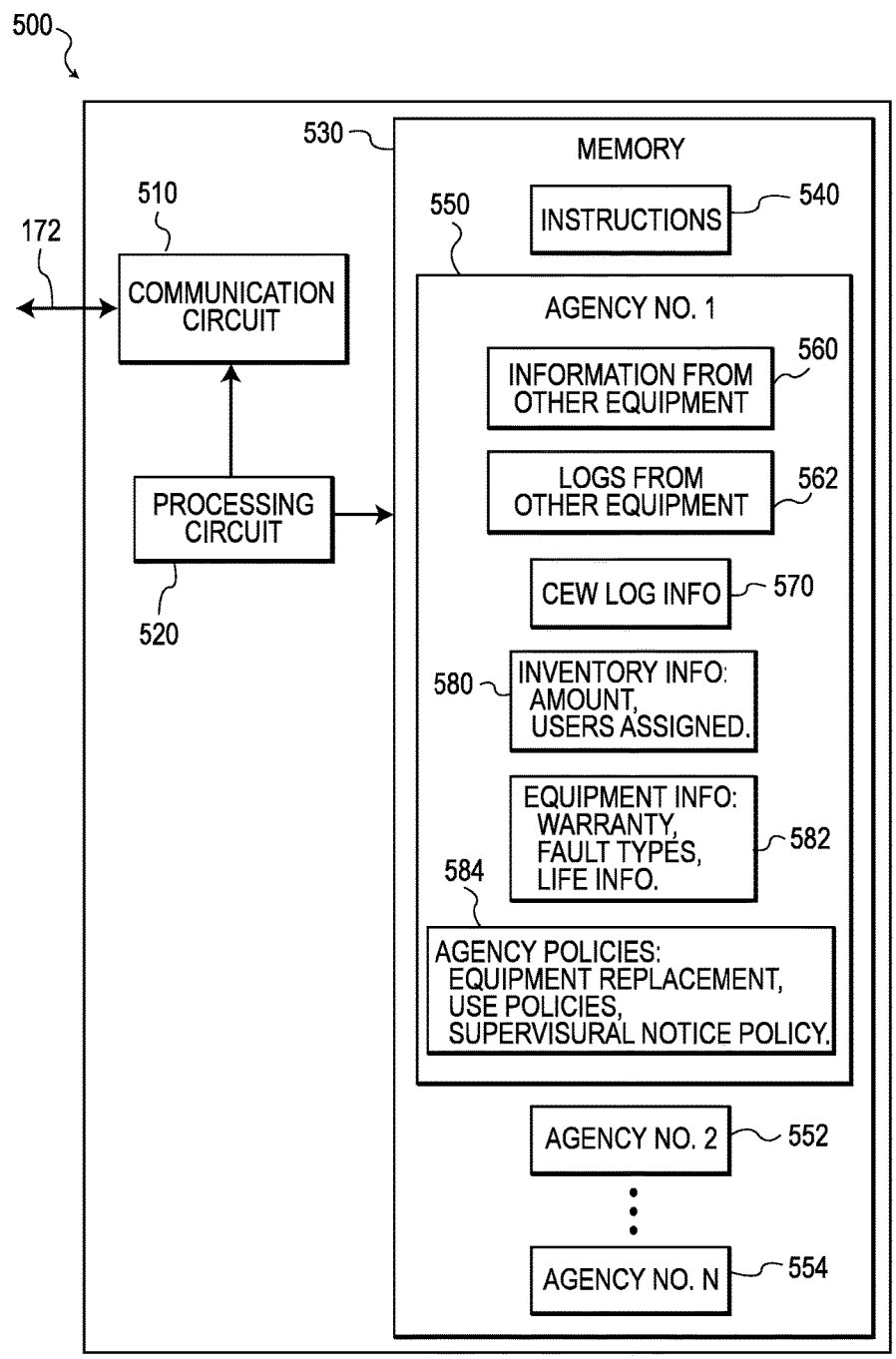
FIG. 5 is a functional block diagram of an implementation of the evidence management system of FIG. 1.

Electronic device 400 of FIG. 4 is an implementation of an electronic device. Electronic device 400 performs the functions of an electronic device and/or electronic devices 120 as discussed herein. Electronic device 400 includes user interface 410, communication circuit 420, GPS receiver 430, processing circuit 440, and memory 450. User interface 410, communication circuit 420, processing circuit 440, and memory 450 perform the functions of a user interface, a communication circuit, a processing circuit, and a memory respectively as discussed herein.

Communication circuit 420 includes short-range communication circuit 422 and long-range communication circuit 424. Short-range communication circuit 422 may use any conventional communication protocol suitable for shorter range communication such as Zigbee, Bluetooth, and Bluetooth low energy. Long-range communication circuit 424 may use any conventional communication protocol suitable for longer range communication such as WiFi, 3G, 4G, and LTE.

For example, electronic device 400 may communicate with CEW 200 via short-range communication circuit 422 using communication link 112. Short-range communication circuit may use the Bluetooth low energy protocol. Electronic device 400 transfers data to evidence management system 170 via network 150. Electronic device 400 may be implemented as a cellular phone, a tablet, a portable computer, and/or a mobile data system in a police cruiser. The communication protocol used by long-range communication circuit 424 via communication link 122 may include WiFi, LTE, 3G and 4G. In the event that electronic device 400 can connect to a network, long-range communication circuit 424 may communicate with other devices and/or servers via network 150.

Processing circuit 440, may control the receipt, flow (e.g. buffering) and transmission of data via short-range communication circuits 422 and/or long-range communication circuit 424. Processing circuit 440 may add data (e.g., augment) to the data from log 252 for transfer to evidence management system 170. GPS receiver 430 and user interface 410 may be sources of data used for augmenting.

Evidence management system 500 may include communication circuit 510, processing circuit 520 and memory 530. Memory 530 may include data structures for storing instructions 540 and information for each agency 550 through 554. Processing circuit 520 may read and execute instructions 540 to perform the functions of evidence management system 500. Communication circuit 510, processing circuit 520, memory 530, and evidence management system 500 may perform the functions of a communication circuit, a processing circuit, a memory, and an evidence management system respectively as discussed herein.

Information stored for each agency (e.g. agency 550, agency 552, agency 554) in memory 530 may include information from other equipment (e.g., video, audio, vehicle, holster) 560, logs from other equipment (e.g., camera log, microphone log, vehicle log, holster log) 562, CEW log information 570, inventory information 580, equipment information 582 and agency policies 584. Information from other equipment 560 may include video data captured by a camera (e.g., other equipment 192). Camera log information may include metadata about the captured video data. Inventory information 580 may include information provided by CEW supplier 160 and security agency 180 as discussed above.

An evidence management system ("EMS") may collect (e.g., receive, request) information for storage and/or analysis. An evidence management system may collect information (e.g., evidence) from CEWs, cameras, electronic devices, agencies, and/or CEW suppliers as discussed above. Information collected by the evidence management system from CEWs may include the log from a CEW. Information from a CEW log may be used to determine an amount of force applied to a target. An evidence management system may determine the use of force from CEW log information such as whether a stimulus signal was provided, an amount of charge delivered, a number of pulses provided, and the number of deployment units activated. Information acquired by the evidence management system from cameras may include audio/visual information. Audio/visual information may be captured at the location of an incident. Audio/visual information may be captured during use of a CEW to deliver a stimulus signal through a target. Information collected from electronic devices may include user information, and GPS location. Information collected from an evidence management system from an agency may include desired inventory levels. An evidence management system may collect and analyze information regarding inventory to perform inventory management. An evidence management system may track inventory used and changes to inventory stock (e.g., decrease, increase, new purchases). Additionally, the evidence management system may place orders for inventory replenishment.

Figure 6:
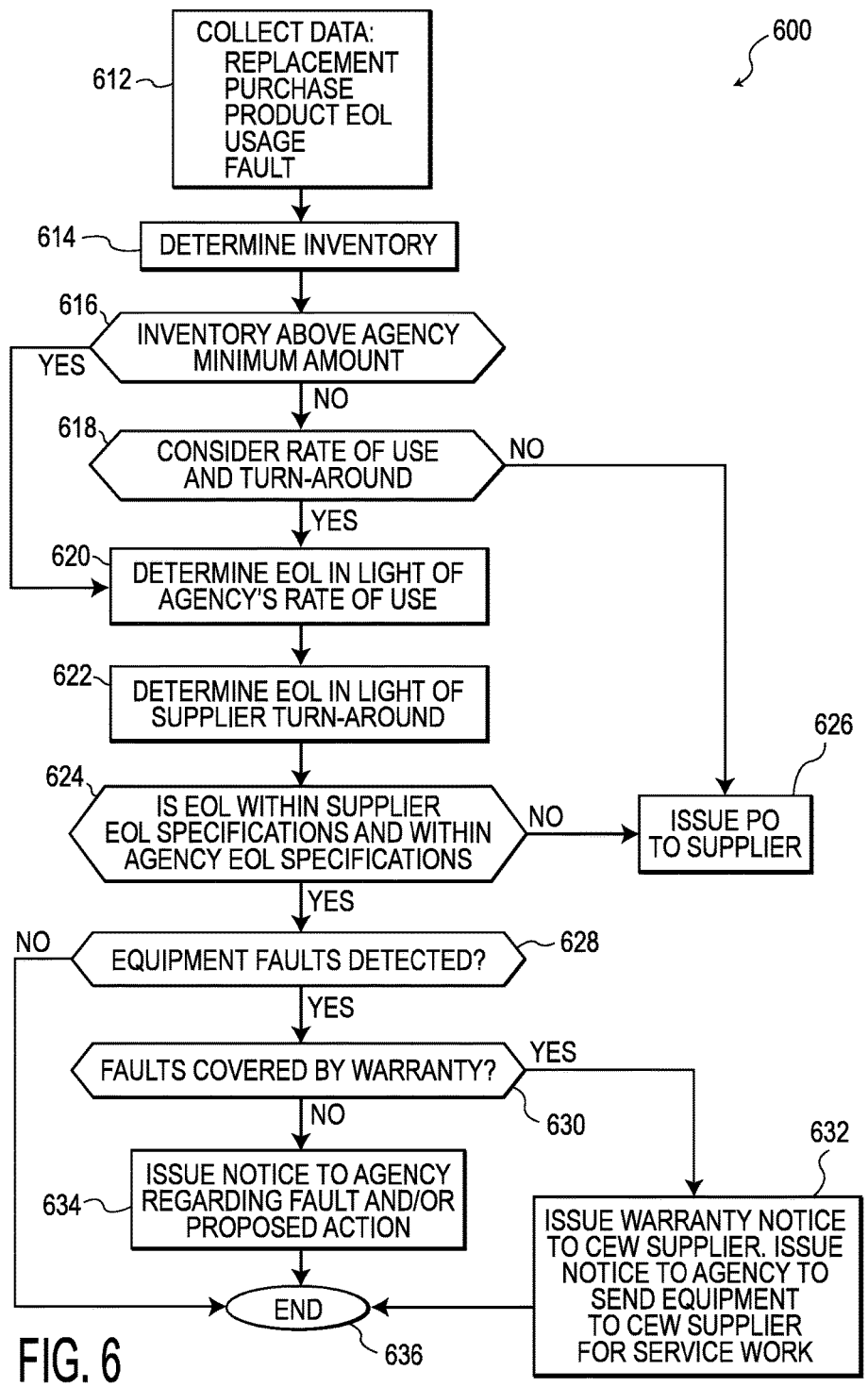
FIG. 6 is a flow chart of a method for inventory control and replenishment.

For example, method 600 of FIG. 6 is performed by an evidence management system to manage (e.g., track, monitor, check, verify) the inventory of CEWs, deployment units, and other accessories for a CEW for an agency. Method 600 may use stored information to order new equipment to replenish an inventory. An evidence management system may replenish inventory without user intervention or minimal user intervention.

A processing circuit may execute a stored program to perform the functions of a method. The blocks (e.g., procedures, steps, subroutines) of a method may be performed serially and/or in parallel. A block of a method may start execution upon receiving sufficient information to perform the function (e.g., operation) of the block. The order of many of the blocks shown in the methods herein may be changed and still accomplish the same result.

Method 600 may include blocks collect 612, determine 614, minimum 616, consider 618, end of life ("EOL") 620, EOL with turn-around 622, test EOL 624, issue 626, detect faults 628, warranty coverage 630, issue 632, issue 634, end 636.

Collect 612 collects information or accesses previously stored information from some or all sources that provide information to the evidence management system. Sources of information, as discussed above, include a CEW which may provide its log, cameras that provide audio visual information, an agency that provides information from a records management system and/or a dispatch system, a supplier of equipment and CEWs, and/or an electronic device.

Determine 614 determines the current level (e.g., amount) of inventory for each piece of equipment (e.g., CEW's, deployment units) for an agency. The evidence management system uses information such as inventory initially purchased by a department, inventory that is still in use (e.g., not broken, not past product life time, assigned to a security officer), and inventory that has been used and must be replaced (e.g., deployment units).

Minimum 616 evaluates the current inventory level and determines whether the inventory is above a minimum amount. Minimum 616 may determine the minimum amount of inventory for an agency using stored data and/or information provided by an agency that specifies minimum levels. If the current level of inventory is equal to or greater than the minimum level of inventory for an agency, execution of method 600 moves from minimum 616 to end of life ("EOL") 620. If the current level of inventory is less than the minimum level of inventory for the agency, execution moves from minimum 616 to consider 618.

Consider 618 evaluates whether rate of use and/or supplier turn around are being taken into consideration. If they are to be considered, execution moves to EOL 620. If not, execution moves to issue 626.

EOL 620 determines the expected end of life ("EOL") for equipment in the inventory while factoring in the agency's rate (e.g., amount) of use. Equipment may have a maximum number of uses before the equipment reaches the end of its useful life. A manufacture may provide information as to EOL for its products. The EOL of a product may be tied to the warranty of the product. For example, a CEW may be rated to deliver a maximum number of stimulus signals. Generally, equipment use may be rated for a duration of time, for example, five years. However, if equipment is used more frequently than standard use expectations, the equipment may reach the end of its useful life before expiration of the normal duration of life expectancy. For example, a non-rechargeable battery for a CEW may have a useful life of a number of stimulus signals or a period of time. In a situation where the agency uses the CEW and the battery at a higher than normal rate, the rate of use may be used to determine the end of the battery's useful life and when it should be replaced. Using the rate at which any equipment is actually used by an agency may be used to determine whether any equipment is approaching the end of its useful life faster than expected.

EOL 620 may further use information regarding technology upgrades to determine whether equipment should be considered to have reached the end of its life due to obsolescence. An agency's rate of use may include planned obsolescence and replacement of equipment at a point in the life of the equipment that occurs prior to the functional end-of-life of the equipment.

An agency's rate of use may also apply to consumable equipment such as deployment units. An agency may on average use a certain percentage of its supply of deployment units each month. EOL 620 may detect a higher or lower rate of use and adjust the quantities of equipment a purchase order accordingly.

EOL with turn-around 622 determines the expected end of life for equipment in the inventory while accounting for CEW supplier turn-around. An equipment supplier's ability to provide replacement equipment may be affected by demand, parts shortages, manufacturing capacity, recalls, or other conventional factors. EOL with turn-around 622 may receive information regarding the turn-around time for particular suppliers. EOL with turn-around 622 may use turn-around information to increase (e.g., slow turn-around) or decrease (e.g., fast turn-around) the number of replacement units order from a supplier. EOL with turn-around 622 may consider an agency's rate of use and a supplier's turn-around time when determining the amount of equipment to order from a particular supplier. Shipping time from the supplier to the agency may be a further factor considered by EOL with turn-around 622 when determine the amount of equipment to order.

Test EOL 624 evaluates whether the adjusted end of life for equipment is within the specified range provided by the manufacture or the agency. An agency may specify whether the equipment manufacture establishes the EOL limit that is used to issue a purchase order or whether the agency overrides the EOL limited of the manufacture to use a EOL limit specified by the agency. An agency may use budget criteria (e.g., ability to purchase new equipment) to adjust the EOL up or down. If test EOL 624 determines that the adjusted EOL is within range, execution moves from test EOL 624 to detect faults 628. If the adjusted EOL is not within the range, execution moves from test EOL 624 to issue 626.

The steps that follow test EOL 624 may be omitted so that if the adjusted EOL is within range, the execution of method 700 moves to end 636.

Issue 626 uses the information about the current inventory level and the minimum inventory level to generate a purchase order. Issue 626 uses information provided by evidence management system 500 regarding suppliers to select a vendor to provide inventory. An agency may specify a preferred vendor. Issue 626 generates the purchase order in the format desired by the entity receiving the purchase order. A purchase order may be issued as a printed purchase order and/or an electronic purchase order. A purchase order may be sent to a supplier using any method suitable for the format produced. Issue 626 sends the purchase order to the supplier in order to replenish the current inventory at least to minimum levels. For example, issue 626 prepares and sends a purchase order to CEW supplier 160 to provide deployment units to replenish an agency's inventory of deployment units. Processing circuit 520 may prepare a purchase order. Processing circuit 520 may transmit (e.g., send) the purchase order to the supplier via communication circuit 510. A purchase order may be generated and sent with little or no human intervention.

Detect faults 628 reviews information regarding equipment to determine whether the equipment has experienced and/or detected any faults. Faults may include mechanical, electrical, and/or user faults. A mechanical and/or electrical fault may occur when mechanical or electro-mechanical components of equipment fail. An electrical fault may occur when an electrical (e.g., transformer) and/or electronic (e.g., capacitor, processing circuit) component fails. A mechanical or electro-mechanical component may fail due to repeated use of the equipment and/or damage to the equipment. For example, faults may result in reduced charge delivery to target (e.g. defective signal generator, deployment unit, electrodes), reduced communication between CEW and electronic devices (e.g., defective communication circuit). Faults may also be software in nature. For example, failure to communicate between CEW and peripheral electronic devices due to firmware bugs. Faults detected with respect to a CEW may be recorded in the log of the CEW. Method 700 may parse the log to find detected faults. If no faults are detected, execution moves to end 636. If faults are detected, execution moves to warranty coverage 630.

Warranty coverage 630 determines whether the detected faults are covered by warranty on the equipment in place at the time of occurrence. Certain equipment use or equipment modifications by agency personnel may void the warranty. For example, using unapproved deployment units. If the device not covered by a warranty, execution moves to issue 634. If covered by warranty, execution moves to issue 632.

Issue 634 sends notice to the agency regarding the fault and/or one or more recommendation. Recommendations may include submitting the equipment for warranty repair, and/or purchase of equipment upgrade. The notice may be generated electronically and sent with little or no human intervention. The notice may include RMA instructions for the agency to return or replace the equipment.

Issue 632 sends a warranty notice to the CEW supplier. Issue 632 may transmit a notice to the agency to send the equipment to the supplier for repair or replacement. After execution of issue 632, execution moves to end 636.

End 636 represents the end of execution of method 600.

Figure 7:
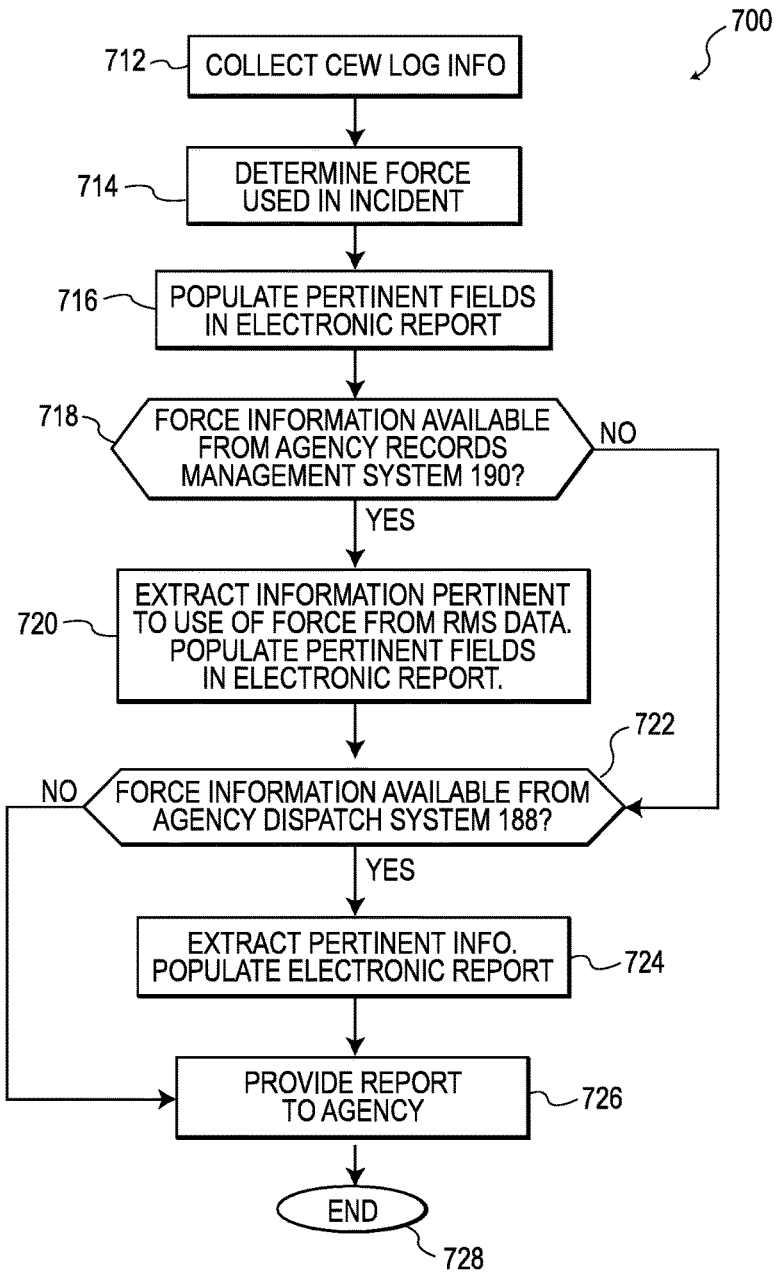
FIG. 7 is a flow chart of a method for producing a use-of-force report regarding a CEW.

Method 700 of FIG. 7 provides an example of data that an evidence management system may collect and operations that an evidence management system may perform to generate (e.g., populate data fields, fill-in data fields, create, compile) a use-of-force report regarding a CEW owned or used by an agency.

Method 700 may include blocks collect 712, determine 714, populate 716, available 718, extract 720, available 722, extract 724, provide 726, and end 728.

Collect 712 collects information (e.g., data) from one or more CEWs. Information provided by a CEW includes log 300. Information from log 300 that may be of interest in generating a use of force report includes cartridge related information 310, signal generator 320, communication 330, user interface 340, user information 370, and system information 380.

Collect 712 may extract information from log 300 that relates to the amount of force applied to a target. Use of force information includes the number of cartridges use during the incident, the number pulses delivered, the number of targets that received a stimulus signal, the amount of charge delivered per pulse, the pulse rate of the pulses in the stimulus signal, whether the CEW operated in the cross-connect mode, and the number of times the officer pulled the trigger or armed or disarmed the CEW.

Determine 714 determines the force used in an incident. An evidence management system may assess the CEW log of one or more CEWs used at an incident. An evidence management system may use audio/visual information captured by cameras at the incident. Audio/visual information may be used to determine, among other things, who was present at the incident, and whether a particular CEW provide a stimulus signal through a particular target. An evidence management system may use geographic information (e.g., geographic coordinate) provided by electronic devices. Geographic information 395 or geographic information from an electronic device paired to a CEW may be used to determine whether a CEW was in the vicinity of the incident.

The evidence management system may assess the stored information, including log 300 from one or more CEW that were present at an incident, to determine, among other things, which CEWs were present at the incident, which personnel were present at the incident, the geographic coordinate of each CEW at the incident, whether a stimulus signal was delivered through a target, the number of stimulus signals delivered through a target, an amount of charged delivered through a target, the time frame over which the stimulus signals were delivered, the compliance of the target in response to the stimulus signal, and the number of deployment units expended to deliver the stimulus signal.

An evidence management system may use stored information provided by an agency to determine the number and identity of security personnel dispatched to an incident and the equipment, (e.g., cameras, CEWs, electronic devices) carried by the personnel to the incident. Information from the agency may be used to correlate and/or verify the information provided by the equipment, such as the information stored in log 300.

Populate 716 inserts (e.g., populates, fills in, aggregates, adds) information collected by the evidence management system which is relevant to use of force, such as the information discussed above, within pertinent fields in an electronic report. Relevant information may include information collected in collect 712 and found in determine 614. An evidence management system may collate (e.g., compare, examine) stored information regarding the use of one or more CEWs to insert relevant information into the report.

The ability of personnel to change (e.g., edit) information inserted by populate 716 may be controlled by a policy of the agency. Agency policy may prohibit the user of the CEW to edit the information collected by the CEW and inserted into a report. Agency policy may permit an armorer or a person who is knowledgeable with respect to CEWs and their operation to edit information inserted by populate 716.

Available 718 evaluates whether information is available from the service records management system of an agency for inclusion in a use-of-force report. Information provided by the records management system may include personnel badge numbers, cases information, case numbers, incident types, and agency policies. A records management system may also be able to provide information such as injuries sustained by officers, bystanders, or perpetrators and medical assistance provided at the scene of the incident or afterwards. If information from a records management system is available, execution moves to extract 720. If it is not available, execution moves to available 722.

Extract 720 will extract pertinent use of force information from the agency's records management system and populate data fields in the electronic report. Information from an agency's records management system may also be used to correlate and/or verify the information provided by other devices such as CEWs, cameras, and/or electronic devices.

Available 722 determines whether information is available from the dispatch system of an agency for inclusion in a use-of-force report. Information from a dispatch system may include time and date of the incident, location of the incident, the type of incident, and number of agency personnel dispatched to the incident. If information is available from the dispatch system, execution moves to extract 724. If no information is available from the dispatch system, execution moves to provide 726.

Extract 724 will extract pertinent use of force information from the agency's dispatch system and populate data fields in the electronic report. Information from an agency's dispatch system may also be used to correlate and/or verify the information provided by other devices such as CEWs, cameras, and/or electronic devices.

Provide 726 will provide (e.g. send) the populated use-of-force report to the agency. Reports may be generated electronically and sent with little or no human intervention. From provide 726, execution moves to end 728. End 728 represents the end of execution of method 700.

Figure 8:
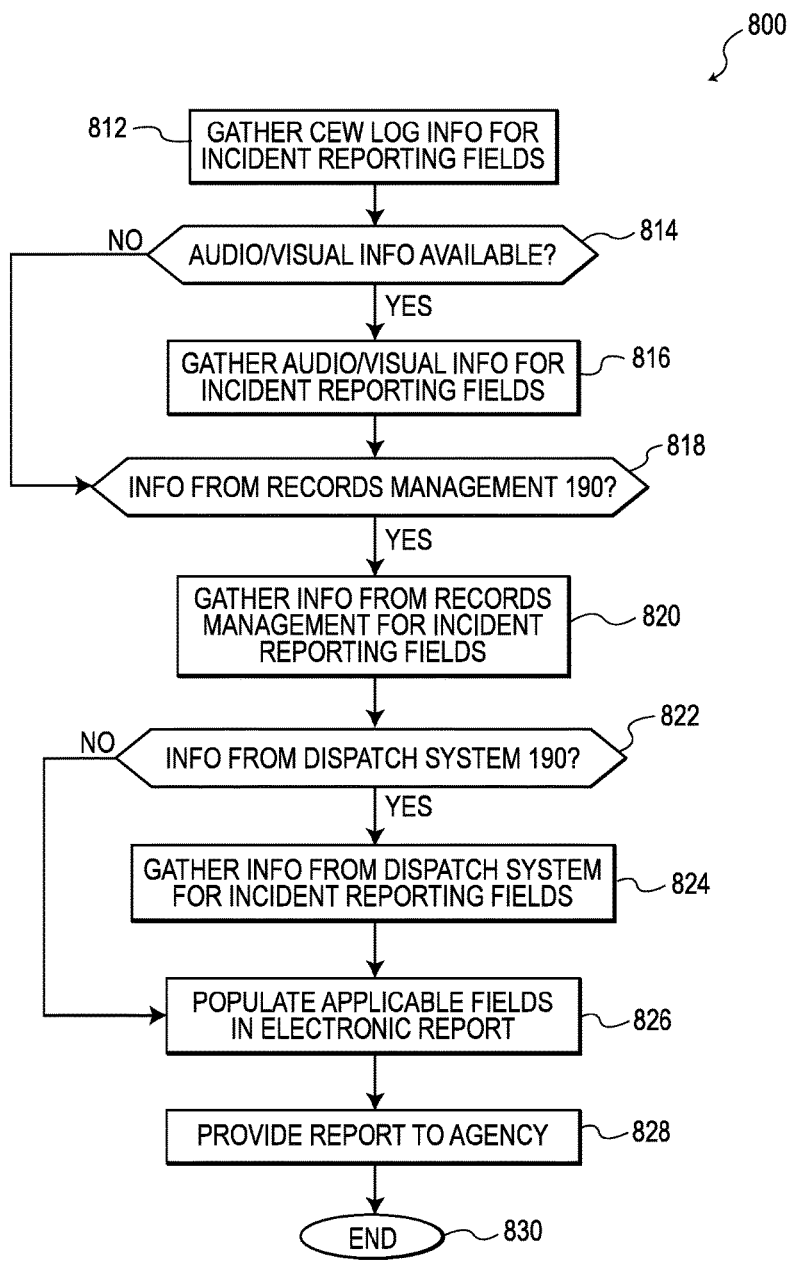
FIG. 8 is a flow chart of a method for producing an incident report that involves a CEW.

Method 800 of FIG. 8 provides an example of data that an evidence management system may collect and operations that an evidence management system may perform to generate (e.g., populate data fields) an incident report regarding an incident. The incident may include the use of a CEW owned or used by an agency.

Method 800 may include blocks gather 812, available 814, gather 816, records 818, gather records 820, dispatch 822, gather dispatch 824, populate 826, provide 828, end 830.

Gather 812 collects information (e.g., data) from one or more CEWs that is related and pertinent to the incident. Gather 812 performs the same process as collect 712 except that the information gather from the CEW log may be different and more closely related to the overall incident rather than only the force delivered by the CEW. Gather 812 may be more interested in communication between the CEW and other devices, whether the CEW was authenticated by any nearby devices during the incident, whether the log was transmitted to an electronic device, the user preferences set on the CEW, the firmware version, the identification numbers of any electronic devices to which the CEW connected and/or communicated, switches activated by the user on the user interface, the amount of power in the battery, and the last date of calibration. If audio/visual information is available execution moves to gather 816. If not, execution moves to records 818.

Gather 816 collects the audio/visual information for the incident report. Audio visual information related to the incident may include the cameras that captured audio/visual information of the events that may be valuable as evidenced, recordings of witnesses, recordings of officers, recordings of perpetrators, recordings of critical events (e.g., arrival of backup, gun shots, use of a CEW, suspects fleeing the area, interference by bystanders, evidence of property damage, drug hand-off, behavior of by-standers, behavior of officers) that occurred during the incident.

Records 818 evaluates whether information is available from the agency's records management system of an agency for inclusion in an incident report. Information provided by the records management system may include personnel badge numbers, cases information, case numbers, incident types, and agency policies, as discussed above, but it may also include the names of witnesses, the names of bystanders, names of perpetrators, arrest records of perpetrators, whether any confidential informers were involved in the incident, a list of possible similar incidents or related incidents, address of locations and/or properties involved in the incident, a history of weapons captured during the incident, autopsy reports, medical examiner findings, media reports, statements made by agency representative, cost to respond to the incident, the amount of overtime paid to respond to the incident, damage to any vehicles and/or equipment during the incident, the names of suspects not capture during the incident, and any following action to be taken.

Gather records 820 collects pertinent information from the records management data and inserts it into the appropriate incident reporting fields.

Dispatch 822 determines whether information is available from the dispatch system of an agency for inclusion in the incident report. Information from a dispatch system may include time and date of the incident, whether a person reported the incident, information provided before and after the incident from the public, the number of available cars and/or personnel available to respond to the indent and/or to provide backup to the personnel who have already responded, whether first responders arrived at the scene of the incident, whether medical and/or fire services were also dispatched to the incident, time of arrival of agency personal, time of leaving of agency personnel, the urgency of the incident, the emotional state of people reporting the incident, identity of the person receiving the calls from the public, and people to whom the information regarding the incident was reported.

Populate 826 extracts pertinent incident information from the agency's dispatch system and populate the proper data fields in the electronic report. Information from an agency's dispatch system may also be used to correlate and/or verify the information provided by other devices such as CEWs, cameras, and/or electronic devices. The information from the dispatch system may be used to correlate statements made by agency personnel, witnesses, perpetrators, and/or the public.

Provide 828 populates (e.g., insert, add) the information gathered from the various sources into the incident report. Provide 828 may send the incident report to authorized recipients at the agency.

End 830 represents the end of execution of method 800.

Figure 9:
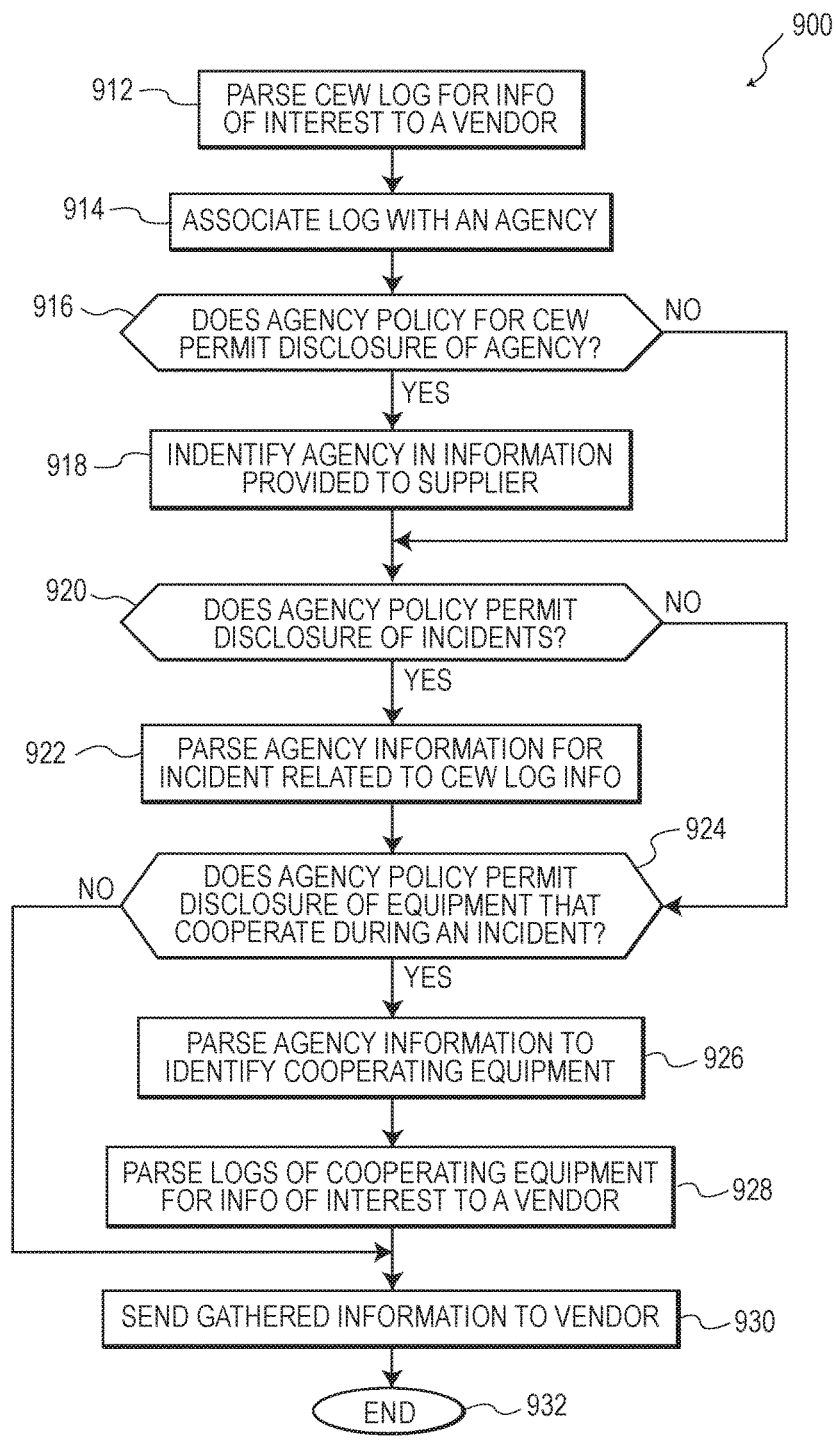
FIG. 9 is a flow chart of a method for reporting information from a CEW to a supplier of the CEW.

Method 900 of FIG. 9 provides an example of data that an evidence management system may collect and operations that an evidence management system may perform to report pertinent information from a CEW log to a CEW supplier.

Various agencies may have a differing policies regarding release of CEW log information to third parties. If disclosure of CEW log information to a third party (i.e. manufacturer, supplier, vendor) is not permitted by the agency then processing circuit 520 will not be programmed to execute or will be prohibited from executing method 900.

Method 900 may include blocks parse 912, associate 914, disclosure 916, identify 918, incidents 920, parse 922, disclosure 924, parse 926, parse 928, and send 930, end 932. Method 900 may be performed by the processing circuit of the server that receives the logs from one or more CEW. The logs may be stored in memory associated with the server.

Parse 912 collects information (e.g., data) from the logs of one or more CEWs. Information provided by a CEW may include the information identified in log 300. Information from log 300 that may be of interest to a supplier includes cartridge related information 310, signal generator 320, communication 330, user interface 340, power 350, firmware updates 360, user information 370, system information 380, calibration log 390 and geographic information 395. Parse 912 scans (reads, parses, analyzes) one or more CEW logs for information that may be relevant to the supplier. Information which is particularly relevant to vendors may include any CEW equipment faults, firmware update information, calibration test results, equipment usages which break warranty, and equipment damage necessitating replacement or repair.

The server of an evidence management system may access information stored in logs from CEWs. The server may determine the CEW that provided the log by accessing CEW identifiers from system information 380 of a log.

Associate 914 associates the log from CEWs to the agency that owns, controls, and/or issued the CEW. Determining the agency associated with the log of a CEW may be easily accomplished if log information is stored in a data structure associated with the agency so that access to the structure provides information as to the agency associated with the information. For example, CEW log information 570 is associated with Agency No. 1 as stored in memory 530. Access to CEW log information 570 indicates that the log information is associated with a CEW owned by Agency No. 1. In the event that CEW log information is not associated with an agency as stored, a processing circuit may parse CEW identifier from system information 380 and use information regarding inventory to determine which agency owns the CEW. In another implementation, the processing circuit may extract the user identifier from user information 370 and use information provided by agencies to determine the association of the user to an agency.

Disclosure 916 evaluates whether the policy of the agency which owns the CEW permits the disclosure of its name to a third party (e.g., supplier). If disclosure of the agency name is permissible, execution moves to identify 918. If disclosure is not permissible, execution moves to incidents 920.

Identify 918 includes information provided to a supplier that identifies the identity of the agency that owns the CEW, so that the supplier knows the identity of the agency when analyzing the log information for a particular CEW. Knowing the identity of the agency when assessing the logs from one or more CEWs may permit a supplier to detect usage patterns or faults that are particular to an agency so that the supplier may provide different, additional, or less inventory or may suggest different practices to agency personnel to avoid faults.

Incidents 920 determines whether the agency permits the disclosure of incidents to a third party such as a vendor. The log of a CEW may be created while being used at an incident. The type of incident, location, and other information about the incident may be useful to a supplier while assessing information from CEW logs. A supplier may use incident information to detect patterns of usage of CEWs or that certain types of faults more likely occur for particular types of incidents.

If agency policy permits the disclosure of incident information associated with a CEW log, the evidence management system may collect such information and send it to a supplier along with the information taken from the logs. If the agency does not permit incident information to be disclosed to a third party, such incident information is not gathered by the server for provision to a supplier. If an agency permits the disclosure of information regarding an incident, execution moves to parse 922. If the agency does not permit the disclosure of incident information to a supplier, execution moves to disclosure 924.

Parse 922 searches for and collects information regarding incidents that are associated with the logs of the CEWs. The evidence management system may consider incidents related if they share certain characteristics. Examples of characteristics of related incidents may include: same responding officers, same CEWs used, same incident type, similar use of force (i.e. lethality, injuries), similar geographic location of incident, same date, and/or same perpetrators. Information regarding the incidents that are related are collected for sending to a vendor.

Disclosure 924 determines whether agency policy permits disclosure of equipment that cooperate during an incident to a supplier. Cooperating equipment may include electronic devices (e.g. an officer's phone), recording devices (e.g. body camera, vehicular cameras), and devices that measure biological functions (e.g. blood alcohol level, drug use, heart rate), and/or devices that measure physical properties (e.g., gas detector, Geiger counter). If disclosure of the cooperating equipment is permissible, execution moves to parse 926. If disclosure is not permissible, execution moves to send 930.

Parse 926 searches the agency for information regarding any cooperating equipment that was present at an incident. The evidence management system may consider equipment to be cooperating at an incident if the information provided by the equipment (e.g. log) contains was captured in the geographic location, on the date, or the time as the incident. Cooperating equipment may be able to receive identifying information from other devices that may facilitate identifying equipment that communicate with each other and particular incidents.

For example, a CEW, an electronic device, a camera, or other devices may periodically transmit a beacon that includes information that identifies the device transmitting the beacon. Other devices may receive the beacon and store the identity of the device from the beacon as evidence that the devices were within transmission and reception range of each other. The date and time of reception may also be recorded. A beacon may also include the geographic coordinate of the transmitter or other information to facilitate identifying cooperating devices.

Parse 928 collects information from logs of the equipment identified by parse 926 as cooperative in an incident. The information collected is provided to a vendor. A vendor may ask for specific information and receive if approved by the agency.

Send 930 provides (e.g., sends) the gathered information to a vendor. The information may be sent electronically with little or no human intervention.

End 932 represents the end of execution of method 900.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification where the location is before or after the location indicator.

What is claimed is:

1. A non-transitory computer-readable storage medium encoded with instructions that, when executed by a processing circuit of a server, establish a machine performing a computer-implemented method for generating a use-of-force report, the method comprising:
   receiving a first information regarding one or more conducted electrical weapons ("CEWs"), the first information includes a respective electronic log from the one or more CEWs, each log includes information regarding one or more operations performed by the CEW including providing a current through one or more targets to impede locomotion of the targets;
   searching the log of each of the one or more CEWs to identify an agency that controls the CEW;
   storing the first information in a data structure that relates the first information to the identified agency;
   receiving a second information regarding an incident, the second information provided electronically by at least one of a records management system and a dispatch system;
   combining at least a portion of the second information with at least a portion of the first information to generate the use-of-force report regarding a use of the one or more CEWs at the incident, the portion of the first information includes the information regarding providing the current through the one or more targets; and
   transmitting the use-of-force report.

2. The method of claim 1 wherein combining comprises:
   searching the second information to determine at least one of a location of the incident and a time of the incident;
   searching the first information to identify each CEW that provided the current proximate to at least one of the location of the incident and the time of the incident; and
   extracting information from the first information related to the operations performed by the identified CEWs for inclusion in the use-of-force report.

3. The method of claim 1 wherein combining comprises:
   identifying one or more fields for receiving information in a predefined electronic report;
   determining the information requested in the one or more fields; and
   extracting at least some of the requested information from at least one of the first information and the second information.

4. The method of claim 1 wherein receiving the second information comprises:
   searching the first information to identify one or more other agencies that control the CEWs proximate to a location of the incident; and
   transmitting an electronic request to the identified one or more other agencies to provide the second information.

5. The method of claim 1 wherein the first information further includes information provided by an electronic device to supplement one or more of the electronic logs.

6. The method of claim 1 wherein transmitting comprises:
   searching the second information to identify one or more agencies that dispatched personnel to a location of the incident;
   searching the first information to determine whether the identified agencies control any of the one or more CEWs that provided the current at the location of the incident; and
   transmitting the use-of-force report to the identified agencies that control any one CEW used at the incident.

7. The method of claim 1 wherein the second information includes at least one of a time of the incident, a date of the incident, a location of the incident, a type of the incident, a case number, a personnel badge number, and a number of personnel dispatched to the incident.

8. The method of claim 1 wherein the first information includes a geographic coordinate of each CEW of the one or more CEWs.

9. The method of claim 1 wherein the first information includes a number of times the current was delivered, a time frame over which the current was delivered, and a number of deployment units expended.

10. A server for generating a use-of-force report, the server comprising:
a processing circuit;
a memory; and
a communication circuit; wherein:
the communication circuit receives via a network a first information regarding one or more conducted electrical weapons ("CEWs"), the first information includes a respective electronic log from the one or more CEWs, each log includes information regarding one or more operations performed by the CEW including providing a current through one or more targets to impede locomotion of the targets;
the processing circuit stores the first information in the memory in a data structure that relates the first information to an agency that controls the one or more CEWs;
the communication circuit receives via the network a second information regarding an incident from the agency;
the processing circuit stores the second information in the memory in the data structure related to the agency;
the processing circuit searches the data structure for information related to the incident and the provision of the current through the one or more targets; and
responsive to searching, the processing circuit generates the use-of-force report regarding a use of the one or more CEWs at the incident.

11. The server of claim 10 wherein the processing circuit generates the use-of-force report by inserting information identified in the search into appropriate fields of a predefined electronic report.

12. The server of claim 10 wherein the processing circuit further:
searches the data structure to determine at least one of a location and the time of the incident; and
searches the data structure to identify each CEW of the one or more CEWs that provided the current proximate to at least one of the location and the time of the incident.

13. The server of claim 10 wherein the processing circuit further searches a data structure related to one or more other agencies to identify one or more other CEWs that provided the current proximate to at least one of a location and time of the incident.

14. The server of claim 10 wherein the communication circuit further transmits the use-of-force report to the agency.

15. The server of claim 10 wherein the first information includes:
information appended to one or more logs of the one or more CEWs; and
the appended information includes a location of use of the CEW to provide the current.

16. The server of claim 10 wherein the second information includes at least one of a time of the incident, a date of the incident, a location of the incident, a type of the incident, a case number, a personnel badge number, and a number of personnel dispatched to the incident.

17. The server of claim 10 wherein the first information includes a geographic coordinate of each CEW of the one or more CEWs.

18. The server of claim 10 wherein the first information includes a number of times the current was delivered, a time frame over which the current was delivered, and a number of deployment units expended.

* * * * *